United States Patent Office 3,136,688
Patented June 9, 1964

3,136,688
5-BROMOMETHYL-HEXACHLORO-BICYCLO-[2,2,1]-HEPTENE-(2) INSECTICIDE
Heinz Frensch, Wilhelm Staudermann, and Walter Finkenbrink, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 14, 1954, Ser. No. 475,274
Claims priority, application Germany Dec. 18, 1953
8 Claims. (Cl. 167—30)

The present invention relates to new pesticidal substances and preparations containing them; more particularly it relates to new unsaturated compounds of the general formula:

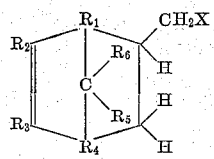

in which $R_1$, $R_2$, $R_3$, $R_4$, $R_5$ and $R_6$ each represent a hydrogen atom or a chlorine or bromine atom, and X represents a chlorine or bromine atom.

The invention also provides pesticidal preparations, which comprise one or more of the compounds of the above general formula in admixture with a liquid or solid diluent.

The compounds of the above general formula can be obtained, for example, by reacting a halogen-cyclopentadiene with an allyl chloride or an allyl bromide at a raised temperature and, if desired, with application of pressure. The reaction is advantageously carried out by using a certain excess of the allyl compound, the serving as solvent and the temperature during the reaction being determined by the boiling point of the allyl compound. Under these protective conditions the reaction product is obtained in a good yield and in high purity. The period required for carrying out the condensation is 10–20 hours. If desired, the product so obtained may be subsequently purified by distillation under reduced pressure.

Thus, for example, 5-chloromethyl-hexachloro-bicyclo-[2,2,1]-heptene-(2) boils at 136–144° C. under a pressure of 2–3 mm. of mercury, and the corresponding bromomethyl-compound boils at 154° C. under a pressure of 1–2 mm. of mercury.

The compounds of the invention are useful for combating various kinds of insects, for example, biting and sucking insects which are met with in agriculture and forestry or inhabit storehouses and the dwellings of animals and human beings. The compounds may be used alone or in admixture with a liquid diluent in the form of a solution or emulsion, or in admixture with a solid diluent in the form of a dusting preparation. It may also be used in admixture with an added substance, for example, a wetting dispersing or adhering agent. Moreover, it may be used together with other active substances, such as insecticides, ovicides, herbicides or fertilizers.

The following examples serve to illustrate the invention, but they are not intended to limit it thereto:

Example 1

The action of 5-chloromethyl-hexachloro-bicyclo-[2,2,1]-heptene-(2) on flies can easily be demonstrated by the Petri dish test. 1 cc. of a solution of 0.3 percent strength of this compound in acetone is distributed on one half of each dish. After the solvent has evaporated a few house flies (*Musca domestica*) are placed in the dish. After 10–20 minutes, all the flies are on their backs and ultimately die. Even on the next day the dry coating still has a lethal action on flies.

Example 2

A dusting preparation composed of 10 percent of 5-bromomethyl-hexachloro-bicyclo-[2,2,1]-heptene-(2) and 90 percent of talc causes Colorado beetles to cease feeding, and after a few hours fall from the plant seriously injured and die.

Example 3

A spraying preparation composed of 25 percent of 5-chloromethyl-hexachloro-bicyclo-[2,2,1]-heptene-(2), 10 percent of cell pitch, 1.25 percent of a wetting agent from oxyethylated nonyl-phenol and 63.75 percent of chalk rapidly paralyses and kills caterpillars of the gypsy moth (*Lymantria dispar*), even those in an advanced state of development, the preparation being sprayed at a concentration of 1 percent for combating caterpillars in an advanced state of development and at a correspondingly lower concentration for those in an earlier state of development.

Example 4

An emulsion containing 2 percent of a mixture consisting of 15 percent of 5-bromomethyl-hexachloro-bicyclo-[2,2,1]-heptene-(2), 75 percent of dioxane and 10 percent of a wetting agent from oxyethylated nonyl-phenol is very rapidly lethal when used for the direct attack of the caterpillars of the brown-tail moth (*Euproctis chrysorrhoea*).

Example 5

A dusting preparation composed of 5 percent of 5-chloromethyl-hexachloro-bicyclo-[2,2,1]-heptene-(2) and 95 percent of talc is very useful for combating grain weevils (*Calandra granaria*). When this dusting preparation is uniformly applied to wheat in a ratio of 1:1000, for example, in a dry seed dressing apparatus, the grain weevils already present and also those appearing after the treatment are rapidly killed.

Example 6

A dusting preparation composed of 10 percent of 5-chloromethyl-hexachloro-bicyclo-[2,2,1]-heptene-(2) and 90 percent of talc has an excellent action against cockroaches (Blattidea). Pests, for example, *Periplaneta americana* and *Phyllodromia germanica*, that come in contact with a very fine dust coating of the preparation are paralyzed within a few hours. The insects remain motionless until they die.

Example 7

An emulsifiable preparation composed of 30 percent of 5-chloromethyl-hexachloro-bicyclo - [2,2,1] - heptene-(2), 50 percent of an organic solvent and 20 percent of an emulsifier from oxyethylated nonyl-phenol, when applied in a concentration ranging from 0.3–0.1 percent, brings about the complete destruction of aphids on various cultivated plants. As compared with other chlorinated compounds of dicyclopentadiene, this compound has the advantage that injury to sensitive plants, for example, cucumbers and melons, is largely avoided.

We claim:

1. An insecticidal emulsion containing about two percent of a mixture comprising 5-bromomethyl-hexachloro-bicyclo-[2,2,1]-heptene-(2), a diluent and a wetting agent.

2. An insecticidal emulsion containing about two percent of a mixture comprising about 15% 5-bromomethyl-hexachloro-bicyclo-[2,2,1]-heptene-(2), about 75% dioxane, and about 10% of a wetting agent from oxyethylated nonyl phenol.

3. A method of combatting insects which comprises applying to their habitat a composition essentially comprising 5-bromomethyl-hexachloro-bicyclo - [2,2,1] - heptene-(2) and a carrier therefor.

4. A method of combatting insects which comprises applying to their habitat an emulsion comprising, as an active component thereof, 5-bromomethyl-hexachloro-bicyclo-[2,2,1]-heptene-(2).

5. A method of combatting insects which comprises applying to their habitat an emulsion containing about two percent of a mixture comprising 5-bromomethyl-hexachloro-bicyclo-[2,2,1]-heptene-(2), a diluent and a wetting agent.

6. A method of combatting insects which comprises applying to their habitat an emulsion containing about two percent of a mixture comprising about 15% 5-bromomethyl-hexachloro-bicyclo-[2,2,1]-heptene-(2), about 75% dioxane, and about 10% of a wetting agent from oxyethylated nonyl phenol.

7. A method of combatting insects which comprises applying to their habitat an insecticidal dust comprising 5 - bromomethyl - hexachloro - bicyclo - [2,2,1] - heptene-(2) and a finely divided solid diluent.

8. A method of combatting insects which comprises applying to their habitat an insecticidal dust comprising about 10% 5-bromomethyl-hexachloro-bicyclo-[2,2,1]-heptene-(2) and about 90% talc.

References Cited in the file of this patent

UNITED STATES PATENTS

| | | |
|---|---|---|
| 2,140,481 | Rose | Dec. 13, 1938 |
| 2,329,074 | Muller | Sept. 7, 1943 |
| 2,352,606 | Alder et al. | July 4, 1944 |
| 2,547,822 | Johnson | Apr. 3, 1951 |
| 2,587,484 | Kittleson | Feb. 26, 1952 |
| 2,657,168 | Buntin | Oct. 27, 1953 |
| 2,676,132 | Bluestone | Apr. 20, 1954 |
| 2,714,619 | Anderegg | Aug. 2, 1955 |

OTHER REFERENCES

Meyers: Derivatives of Hexachlorocyclopentadiene and 1,2,3,4-Tetrachlorocyclopentadiene, pp. 60–62, Purdue University thesis, 1950.

Rakoff: Derivatives of Hexachlorocyclopentadiene, p. 29, Purdue University thesis, 1950.